United States Patent [19]
Tommarello et al.

[11] Patent Number: 5,518,402
[45] Date of Patent: May 21, 1996

[54] FIRE FIGHTER TRAINER HAVING PERSONAL TRACKING AND CONSTRUCTIVE INJURY DETERMINATION AND METHODS OF TRAINING

[75] Inventors: Domenic A. Tommarello, Pittsburgh, Pa.; Walter Sobkiw, St. Petersburg, Fla.

[73] Assignee: Contraves, Inc., Pittsburgh, Pa.

[21] Appl. No.: 196,522

[22] Filed: Feb. 15, 1994

[51] Int. Cl.$^6$ ................................................. G09B 19/00
[52] U.S. Cl. ................................. 434/226; 434/219
[58] Field of Search ................................ 434/226, 219, 434/218

[56] References Cited

U.S. PATENT DOCUMENTS

| | | | |
|---|---|---|---|
| 3,035,772 | 5/1962 | Hough et al. | 434/218 X |
| 4,299,579 | 11/1981 | Swiatosz et al. | 434/226 |
| 4,303,396 | 12/1981 | Swiatosz | 434/226 |
| 4,303,397 | 12/1981 | Swiatosz | 434/226 |
| 4,526,548 | 7/1985 | Livingston | 434/226 |
| 4,861,270 | 8/1989 | Ernst et al. | 434/226 |
| 4,983,124 | 1/1991 | Ernst et al. | 434/226 |
| 5,266,033 | 11/1993 | Rogers et al. | 434/226 |
| 5,316,484 | 5/1994 | Layton et al. | 434/226 |

*Primary Examiner*—Gene Mancene
*Assistant Examiner*—Jeffrey A. Smith
*Attorney, Agent, or Firm*—Ansel M. Schwartz

[57] ABSTRACT

The present invention is a fire fighter trainer. The fire fighter trainer is used to train fire fighters to extinguish a simulated fire scenario. The fire fighter trainer includes a burner assembly for providing fire and a mechanism for detecting application of fire suppressant, suppressing agent or surrogate suppressing agent. The detecting mechanism is disposed adjacent to the burner assembly, such as below it. The fire fighter trainer also includes a control system for controlling the burner depending on a signal from the detecting mechanism. The control system also comprises a mechanism for determining if a burning object simulated by the burner assembly would reignite based on application of fire suppressing agent and parameters defining a simulated burning object. The control system is in communication with the detecting mechanism and the burner assembly. Preferably, there is a mechanism for reigniting the burner assembly based on an output of the determining mechanism. The fire fighter trainer can also have a personal tracking device for determining a fire fighter trainer's position in the fire scenario. The tracking device can communicate with the control system to determine if the fire fighter would have been in danger due to the fire and smoke.

28 Claims, 6 Drawing Sheets

FIRE FIGHTER TRAINER HAVING PERSONAL TRACKING AND CONSTRUCTIVE INJURY DETERMINATION AND METHODS OF TRAINING

FIELD OF THE INVENTION

The present invention is related in general to fire fighter training. More specifically, the present invention is related to a fire fighter trainer and method which reignites a burner, or records reignition, based on heat content parameters defining a simulated burning object and the effect thereof on a fire fighter.

BACKGROUND OF THE INVENTION

Fighting fires is a hazardous activity which requires skill and experience if one is to avoid injury. In order to train fire fighters, various training systems have been developed which simulate, to some degree, a fire scenario. For instance, U.S. Pat. No. 5,052,933 discloses a fire fighter trainer which has a plurality of gas burners which are controlled to simulate a scenario of fire growth and spread. This trainer has a detection system for detecting the application of fire extinguishing agents. The flame of the burners are reduced and finally shut off in proportion to the amount of detected fire extinguishing agent.

However, in real life, fires can reignite after they have been extinguished. This is due to the fact that burning objects have stored heat. The reigniting of a fire is an extremely dangerous situation since, for example, the reignited fire can block exit from a structure. Thus, in order to present a fire fighter with a more realistic fire scenario, it is necessary to simulate heat content of a simulated burning object and to possibly reignite a burner based on these parameters and determine the effect of the same on the fighter, i.e. would he be injured, killed, etc. In this manner, fire fighters can learn to apply an amount of fire suppressing which not only extinguishes the fire but also reduces the heat content of the burning object to a level where it cannot reignite. Furthermore, recording of the event would enable the fire fighter to learn a technique without experiencing an actual reflame should safety considerations dictate. The present invention describes such a fire fighter training system and method.

SUMMARY OF THE INVENTION

The present invention is a fire fighter trainer. The fire fighter trainer is used to train fire fighters to extinguish a simulated fire scenario. The fire fighter trainer includes a burner assembly for providing fire and a mechanism for detecting application of fire suppressant, suppressing agent or surrogate suppressing agent. The detecting mechanism is disposed adjacent to the burner assembly, such as below it. The fire fighter trainer also includes a control system for controlling the burner depending on a signal from the detecting mechanism. The control system also comprises a mechanism for determining if a burning object simulated by the burner assembly would reignite based on application of fire suppressing agent and parameters defining a simulated burning object. The control system is in communication with the detecting mechanism and the burner assembly. Preferably, there is a mechanism for reigniting the burner assembly based on an output of the determining mechanism. Alternatively, the determination of reignition can be documented without actual reignition of the burner assembly.

The fire fighter trainer simulates stored heat based on various parameters stored in the memory of the computer. There are various ways to simulate heat content. For instance, a theoretical model of the object parameters such as mass, surface area and material properties can be associated with each burner assembly. The computer determines reignition and flame magnitude as a function of the stored object parameters, the type and amount of fire suppressing agent and time.

Alternatively, in order to realistically provide a value of stored heat, a mass can be disposed adjacent to the burner assembly. A thermocouple can be disposed in contact with the mass. The mass can be a block of metal, for instance, or can be the burner itself. The thermocouple is in communication with the computer and is used to provide a real time value of stored heat in the mass.

The fire fighter trainer can also have a personal tracking device for determining a fire fighter trainer's position in the fire scenario. The tracking device can communicate with the control system to determine if the fire fighter would have been in danger or injured due to the fire and smoke. The tracking device is also important in terms of safety.

The present invention is also a method of training fire fighters. The method comprises the step of applying a fire suppressing agent to a burner assembly. Then, there is the step of automatically determining if a burning object simulated by the burner assembly would reignite based on application of fire suppressing agent and heat content parameters defining the simulated burning object. Preferably, the method includes the step of reigniting the burner. Preferably, the controlling step includes the step of measuring application of fire suppressing agent. Preferably, before the applying step, there is the step of inputting into a computer the heat content parameters of the simulated burning object.

BRIEF DESCRIPTION OF THE DRAWINGS

In the accompanying drawings, the preferred embodiment of the invention and preferred methods of practicing the invention are illustrated in which.

DESCRIPTION OF THE PREFERRED EMBODIMENT

Figure 1:
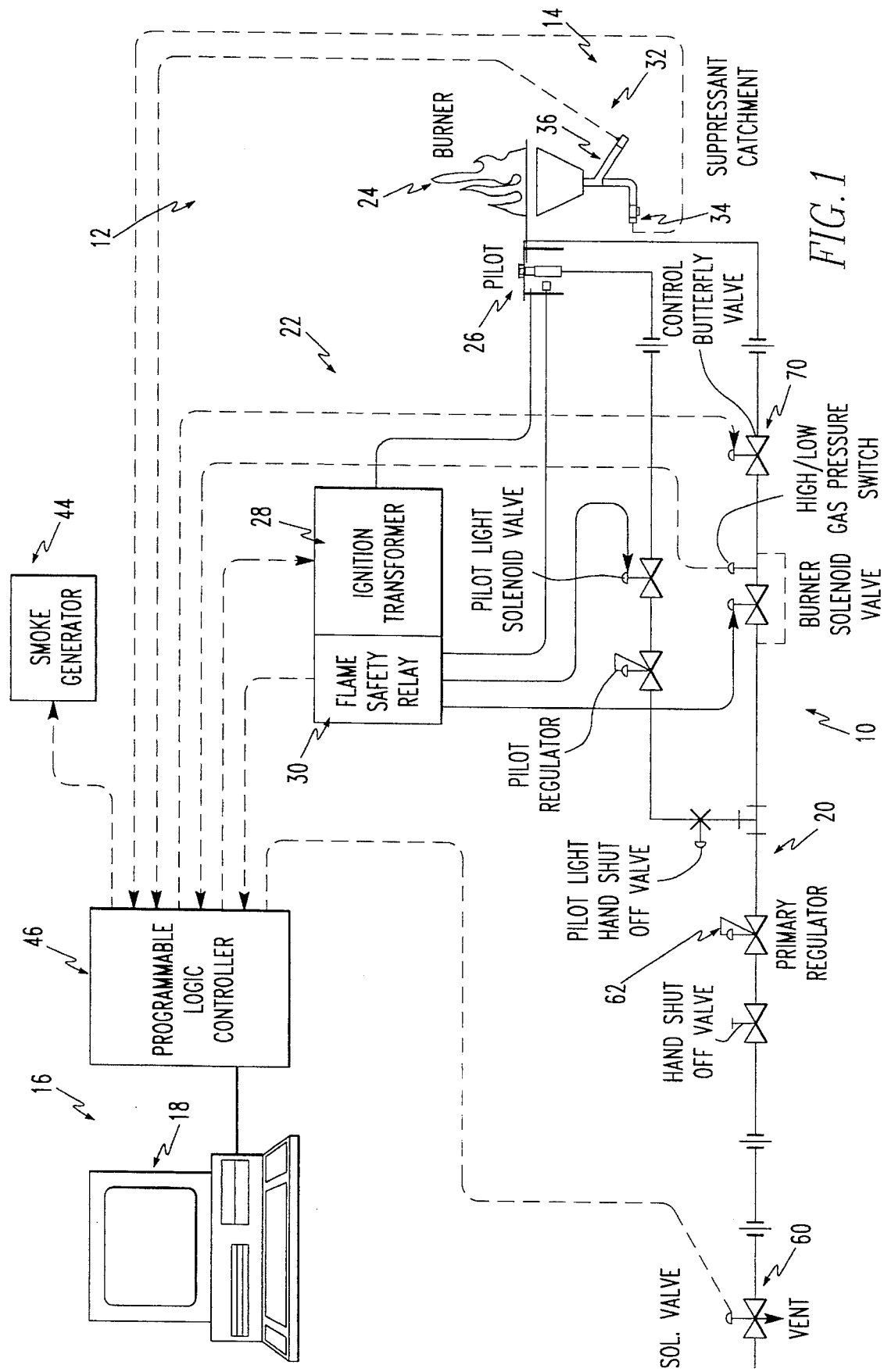
FIG. 1 is a schematic representation showing the fire fighter trainer.

Referring now to the drawings wherein like reference numerals refer to similar or identical parts throughout the several views, and more specifically to FIG. 1 thereof, there is shown a fire fighter trainer 10. The fire fighter trainer 10 is used to train fire fighters to extinguish a simulated fire. The fire fighter trainer 10 includes a burner assembly 12 for providing fire and means 14 for detecting application of fire suppressing agent or surrogate suppressing agent. The detecting means 14 is disposed adjacent to the burner assembly 12, such as below it. The fire fighter trainer 10 also includes a control system 16 for controlling the burner 12 depending on a signal from the detecting means 14. The control system 16 comprises means for determining if a burning object simulated by the burner assembly would reignite based on application of fire suppressing agent and parameters defining a simulated burning object. The control system 16 is in communication with the detecting means 14 and the burner assembly 12. Preferably, the control means comprises means for reigniting the burner assembly 12 based on a determination by the determining means. Alternatively, the determining means can record that reignition would have occurred without reigniting the burner assembly. In this manner, the danger associated with reignition is avoided while a determination if reignition would have occurred can be recorded for training purposes. The burner assembly 12 can also be controlled to provide a preflash.

The fire fighter trainer 10 allows a fire fighter to face a more realistic fire scenario than was known in the past. For instance, in the past, the burner assemblies were turned off and stayed off once a predetermined amount of suppressing agent was detected. However, in real life, fires can reignite after they are completely extinguished. This is due to the fact that burning objects have stored heat. Therefore, fire fighters must learn to apply an amount of fire suppressing agent which not only extinguishes the fire but also reduces the heat content of the burning object.

The fire fighter trainer 10 simulates stored heat based on various parameters stored in the memory of the computer 18. There are various ways to simulate heat content. For instance, theoretical object parameters such as mass, surface area and material properties can be associated with each burner assembly 12. The computer 18 determines reignition and flame magnitude as a function of the stored object parameters, the type and amount of fire suppressing agent and time.

Figure 4:
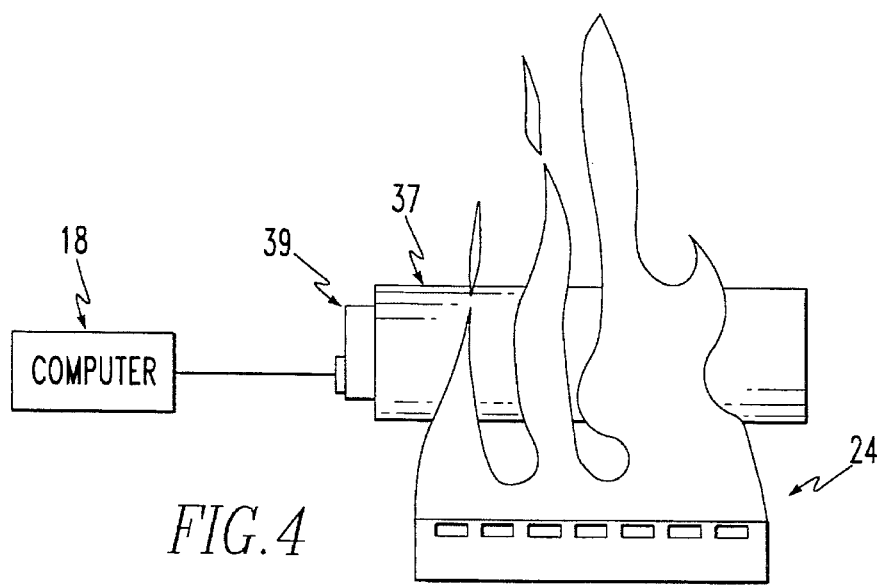
FIG. 4 is a schematic representation showing the burner with an adjacent mass for determining heat content.

Alternatively, as shown in FIG. 4, in order to realistically provide a value of stored heat, a mass 37 can be disposed adjacent to the burner 24. A thermocouple 39 can be disposed in contact with the mass. The mass 37 can be a block of metal, for instance, or can be the burner itself. The thermocouple 39 is in communication with the computer 18 and is used to provide a real-time value of stored heat in the mass 37.

In a preferred embodiment, the burner assembly 12 comprises a fuel delivery system 20, an ignition system 22 and at least one burner 24. Preferably, the ignition system 22 comprises a pilot assembly 26 and an ignition transformer 28. The ignition transformer 28 is in communication with the computer 18 such that the computer 18 controls the ignition transformer 28 to cause the pilot assembly 26 to light.

Preferably, the fuel delivery system 20 comprises a flame safety relay 30 for automatically shutting off gas to the burner 24 and pilot 26 if a sensed condition takes place. The trainer 10 can have a plurality of burners 24 controlled by the control system 16. The total number of burners 24 will depend on the application.

Figure 2:
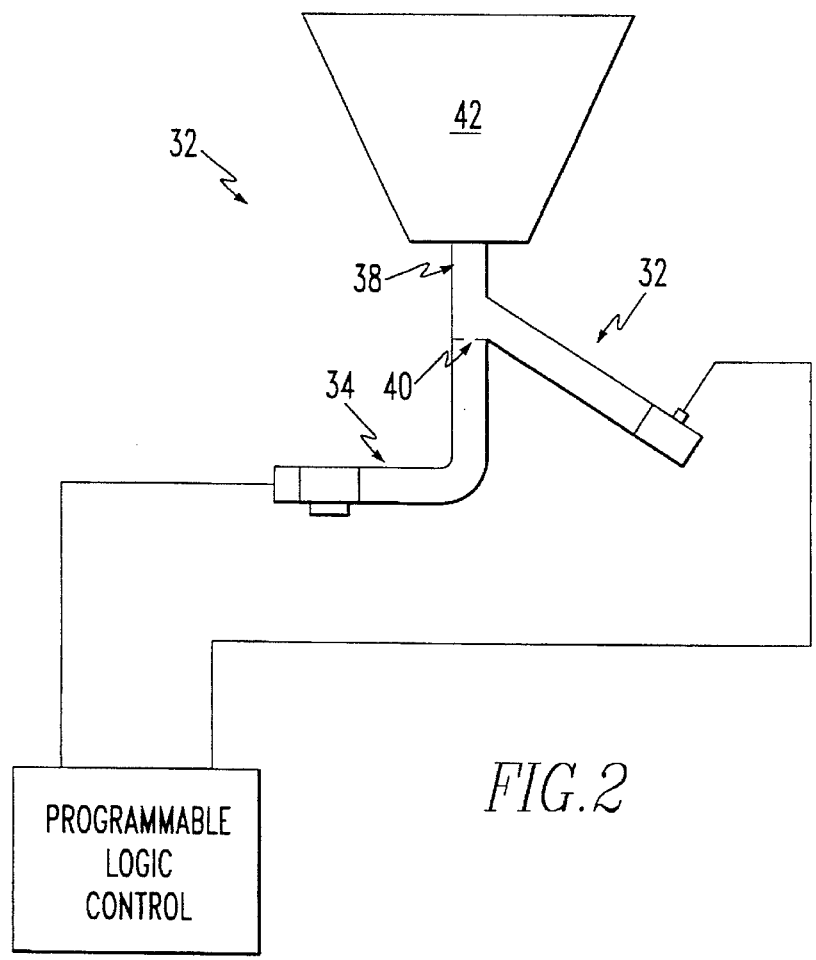
FIG. 2 is a schematic representation showing the fire suppressant catchment assembly.

Preferably, as best shown in FIG. 2, the detecting means 14 comprises a suppressant catchment system 32 for measuring the amount of fire suppressant and communicating a corresponding signal to the control system 16. The suppressant catchment system 32 is in communication with the control system 16. The suppressant catchment assembly 32 comprises a first portion 34 for measuring liquid fire suppressant and a second portion 36 for measuring foam fire suppressant. The first portion 34 and second portion 36 are in communication with a common channel 38 with the channel 38 having a screen 40 for separating foam from liquid. Thus, liquid fire suppressant collected by basin 42 flows through the screen 40 to the first portion 34. The first portion 34 measures the volume of liquid in any desired manner. Foam fire suppressant, on the other hand, is caught by screen 40 and is diverted to second portion 36. The second portion measures the amount of foam.

Figure 3:
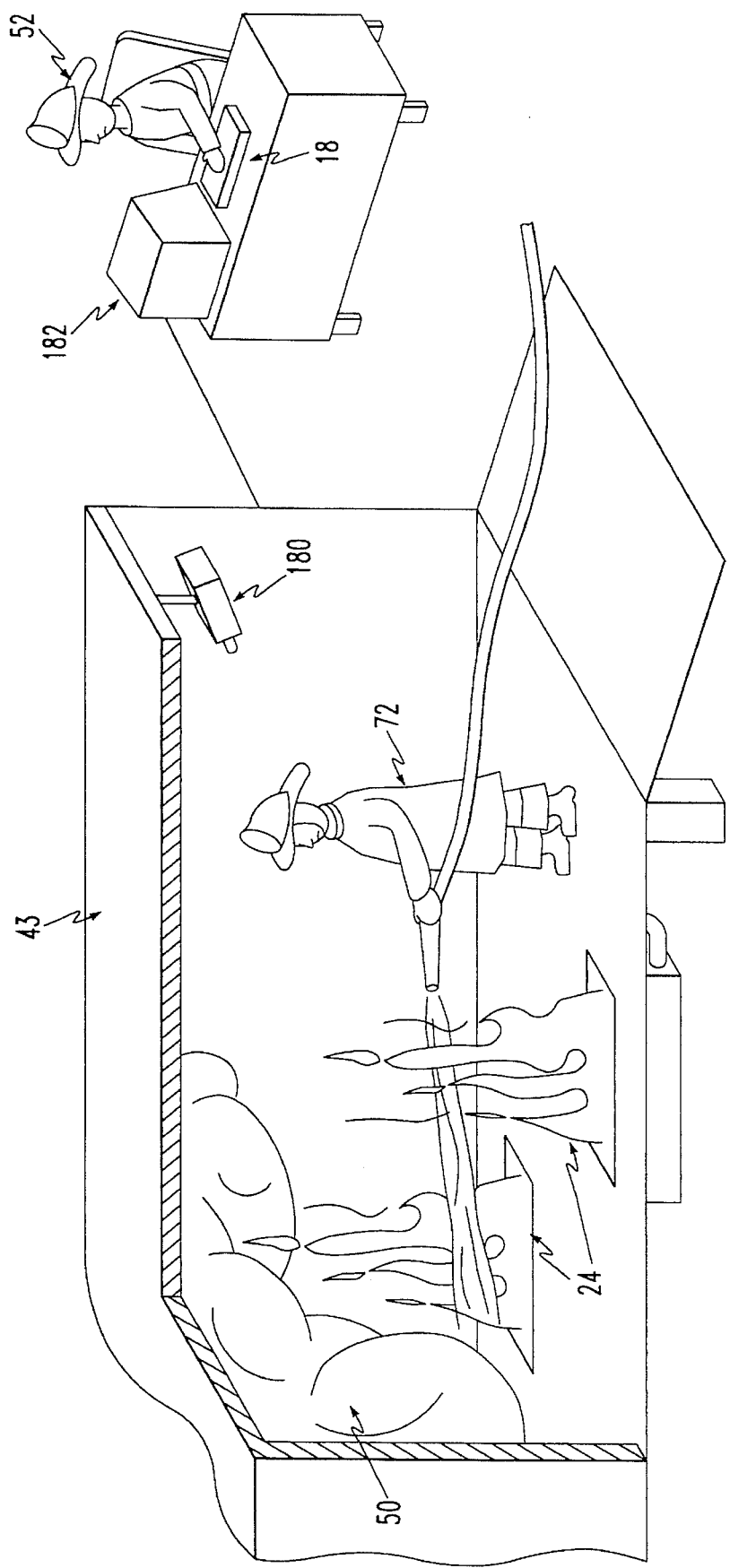
FIG. 3 is a schematic representation showing firemen using the fire fighter trainer.

As shown in FIG. 3, the fire fighter trainer 10 can include a simulated burning structure 43 within which the burner assembly 12 and detecting means 14 are disposed. For instance, the structure 42 can be a simulated crashed airplane or a building, but is not limited thereto. Preferably, there is also a smoke generator 44 for providing smoke in the structure 42, thus simulating a more realistic fire scenario.

As described previously, the control system 16 can include a computer 18, such as a basic personal computer having the necessary fire simulation software. Preferably, the control system 16 also comprises a programmable logic controller 46. The programmable logic controller 46 acts as an interface between the detecting means 14, burner assembly 12 and the computer 18. Preferably, the memory of the computer 18 comprises a table defining fire extinguishing properties of specific fire suppressants. This data is input into the computer 18 along with other critical data, such as heat content parameters, prior to fire simulation.

Figure 5:
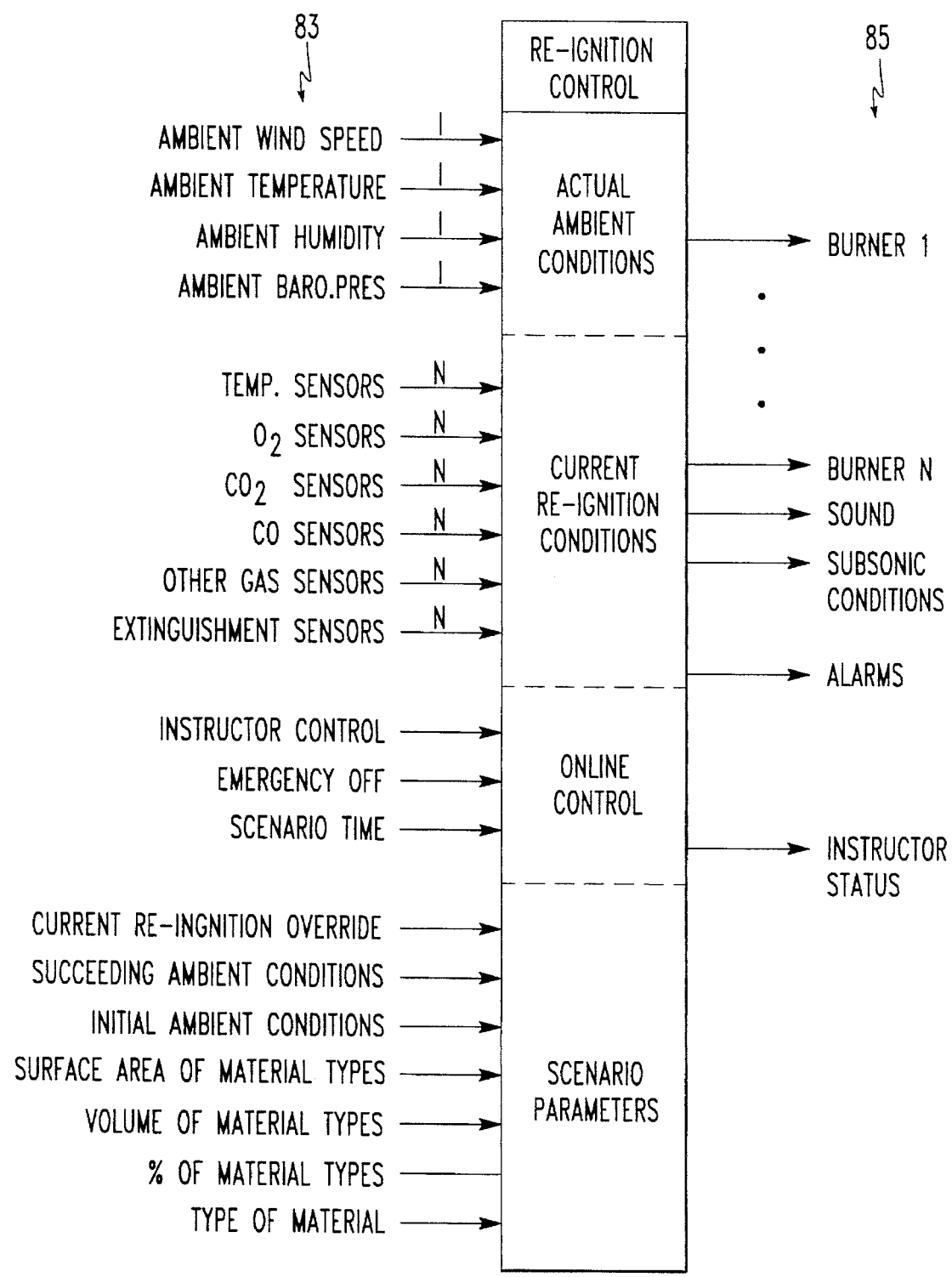
FIG. 5 is a schematic representation showing inputs and outputs of the reignition control.

FIG. 5 illustrates the reignition control of the computer 18. The reignition control can have a variety of inputs 83 pertaining to ambient conditions such as wind speed, temperature, humidity, and barometric pressure. The reignition control can also have inputs from temperature sensors, $O_2$ sensors, $CO_2$ sensors, CO sensors or other gas sensors. The suppressant catchment system 32 is also an input to the reignition control. The reignition control can also have inputs of an instructor control, an emergency off, and a timer. Scenario parameters such as current reignition override, succeeding ambient conditions, initial ambient conditions, surface area, volume of material, % of material types and type of materials can also be used as input control for the reignition control means.

The reignition control which receives all these inputs for each burner determines whether the burner should be ignited, extinguished or reignited. For instance, if the burner which ignites the flame is housed in an object that is to simulate a cloth material, such as a sofa, the computer has programmed into it all parameters which are recognized to contribute to the ignition of a sofa of such material and size and shape. The reignition control determines whether conditions are present for the burner associated with the sofa to ignite a flame. Furthermore, if there is enough suppressant such as $CO_2$ or CO, then the flame from the burner associated with the sofa will be extinguished. However, if there is not enough of the suppressant present to lower the temperature properly, based on the suppressant sensed and the temperature present, the reignition control will determine the deterioration rate of the suppressant on the sofa and reignite the burner, or record a reignition if it is too dangerous to reignite the burner.

The outputs 85 of the reignition control are in communication with the burners 24 so they can reignite if determined to do so. The reignition control can also control sound, subsonic conditions and an alarm. Furthermore, the reignition control can have an instructor status output for allowing the instructor to monitor the scenario and fire fighting conditions.

Figure 6:
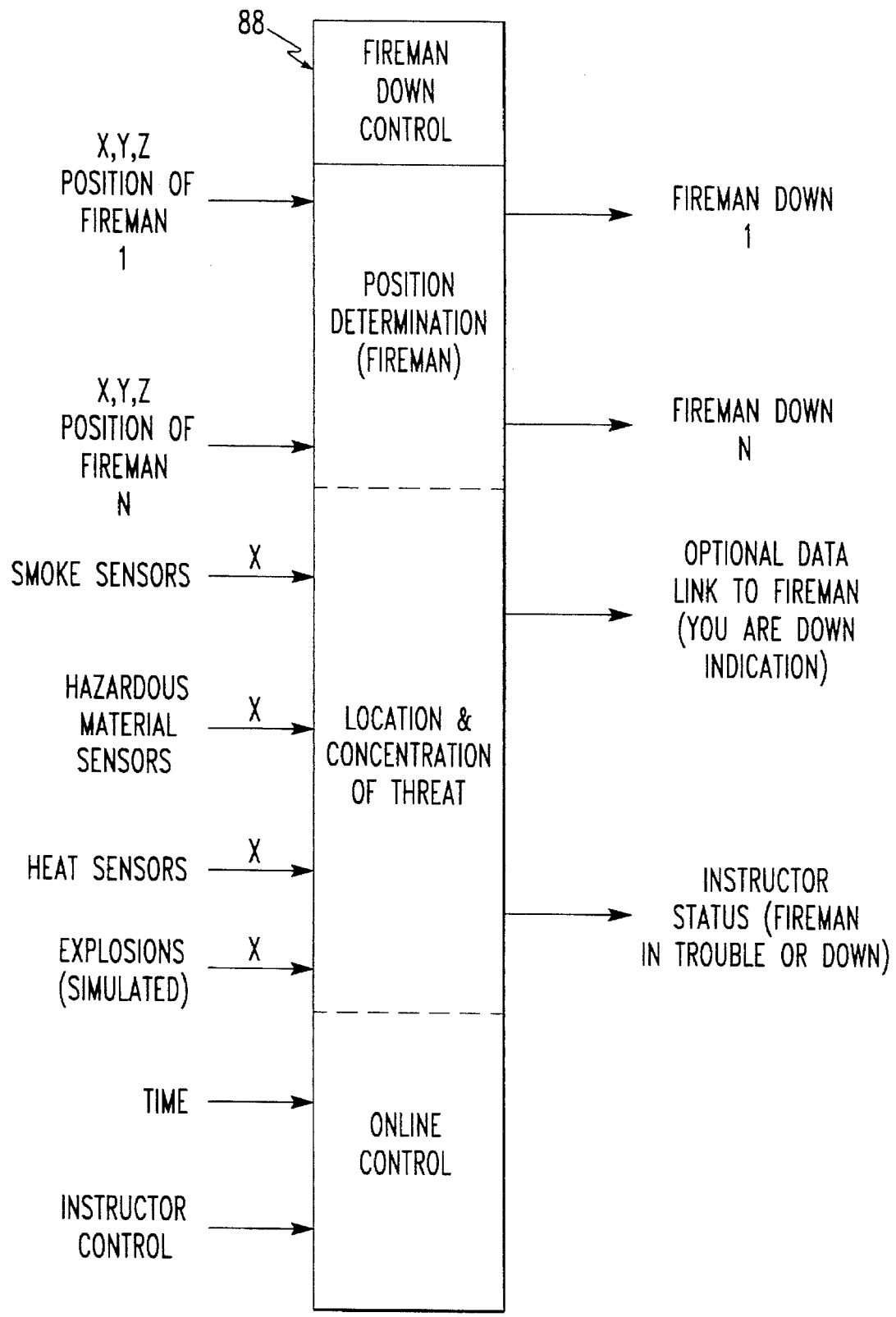
FIG. 6 is a schematic representation showing the inputs and outputs of the fireman down control.
Figure 7:
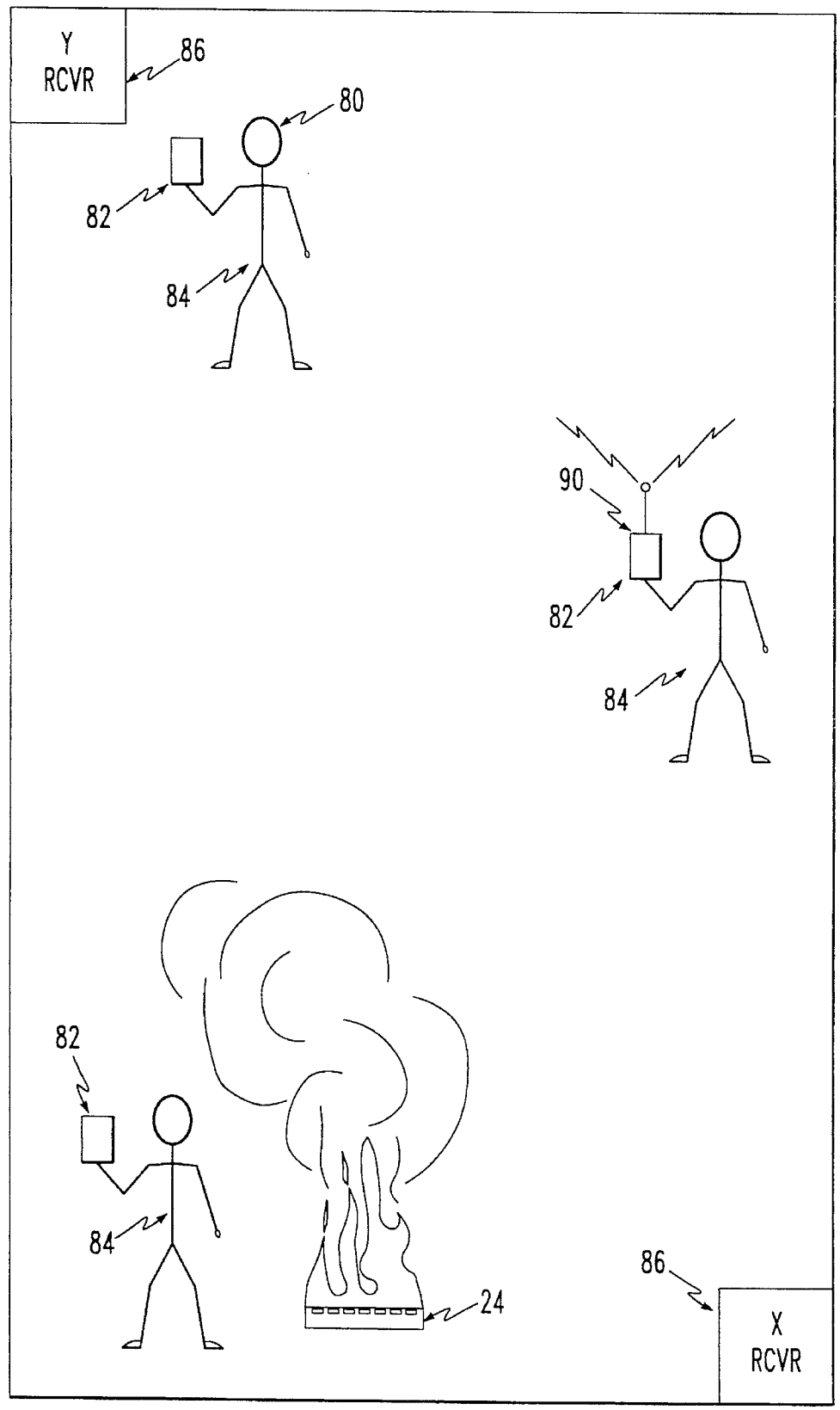
FIG. 7 is a schematic representation showing the personal tracking device.

As shown in FIGS. 6 and 7, the present invention also pertains to a fire fighter trainer having a personal tracking device 80 for determining a fire fighter trainer's position in relation to the burners 24.

The tracking device 80 can be of any desirable construction that is capable of reliably determining the location of the fire fighter trainee 84. For instance, the personal tracking device 80 can comprise a transponder which can use ultrasonic sound or radio frequency for position determination and communication. Alternatively, the personal tracking device 80 can comprise a global positioning system.

In a preferred embodiment, the personal tracking device 80 comprises a tracking unit 82 worn by the fire fighter trainee 84 and receivers 86 communicating with the tracking unit 82 for maintaining a track on the fire fighter trainee 84. One receiver 86 can maintain a track on the Y-position of the fire fighter trainee 84 while another receiver 86 can maintain a track on the X-position of the fire fighter trainee 84.

The tracking unit 82 can also have data link capabilities for allowing computer 18 to communicate with it. For instance, the tracking unit 82 can have a display 90 for providing information to the fire fighter 84, such as "You would be suffocating now if this was a real fire." or "Leave the area immediately.".

It should be appreciated that the tracking device 80 connects the position of the fire fighter trainer with the fire scenario in a total system. In this manner, the computer 18 determines, with accuracy, the safety of the fire fighter trainee 84. The fire fighter trainee 84 can have a more realistic evaluation of his/her performance.

In regards to the fireman down control 88, it receives the positions of the firemen and the fire simulator. It also receives the information from the smoke sensors, hazardous material sensors, heat sensors, explosions (simulated), time, and instructor control, to name some of the various inputs it could receive. For each fireman, it tracks the position of the fireman over time in the simulator and that fireman's proximity to the smoke, explosions, heat, hazardous materials, etc. that are sensed by the respective sensors and determines whether the fireman was injured at any time during the simulation. For instance, as would be well known in the art, if the smoke sensors detected smoke at a predetermined density, and the fireman was within a predetermined distance from the smoke, then the fireman would be determined to have asphyxiated, or blacked out, etc. Similarly, for the simulated explosions or the hazardous material or the heat sensors with respect to physical injury, their effect to the fireman can be determined. Based on the determination of the fireman down control 88, a signal will be sent to the fireman to indicate if he was constructively injured (that is, if it had been a real situation, not a simulated situation, then the identified injury would have been a real injury to the trainee) during the simulation and also possibly recorded.

Numerous fire fighters 84 can train with the trainer 10 at the same time. The computer 18 can be adapted for simulating a plurality of different scenarios, burners, and trainee locations. The computer 18 can comprise a collection of software submodules for each scenario. The submodules can each run independently.

As shown in FIG. 3, the control system 16 can also have a camera 180 which can be remote controlled by supervisor 52. A monitor 182 can be used by the supervisor 52 to view the fire scenario. In this manner, the supervisor 52 can watch for danger and manually control the burners 24.

The present invention is also a method of training fire fighters. The method comprises the step of applying a fire suppressing agent to a burner assembly. Then, there is the step of automatically determining if a burning object simulated by the burner assembly would reignite based on application of fire suppressing agent and heat content parameters defining a simulated burning object. If desired, there can be the step of reigniting the burner assembly. Alternatively, the determination can simply be recorded without reignition.

Preferably, the controlling step includes the step of measuring application of fire suppressing agent. Preferably, before the applying step, there is the step of inputting into a computer 18 the heat content parameters of the simulated burning object. Further, before the applying step, there can be the step of inputting into a computer 18 fire extinguishing properties of specific fire suppressants. During the controlling step, the burner assembly 12 has a fire output dependent on a type of fire suppressant, a detected amount of suppressant and a calculated value of the heat content of the object.

In the operation of the invention, a structure 42 having a plurality of burners 24 and a smoke generator for generating smoke 50 is set up. The computer 18 is operated by an instructor 52. Initially, the computer 18 is programmed with the necessary parameters. This may include what type of fire suppressing agents are going to be used and the parameters used to simulate stored heat content of the objects simulated by burners 24.

During a run, initially, the main solenoid valve 60 is opened by the computer 18 to allow propane to flow into the fuel delivery system 20. A primary regulator 62 regulates the propane to the proper pressure. Propane gas flows to the pilot regulator 66 which further reduces the pressure to the proper pressure for the pilot 26. Pilot 26 is lit by transformer 28. Gas output to the burner 24 is controlled by butterfly valve 70 which is controlled by the computer 18. During the run, the computer 18 controls the burner assembly 12 according to a predetermined fire scenario. Trainee 72 is directed to extinguish the fire. Trainee 72 enters the structure and applies fire suppressing agent to the burners 24. The fire suppressing agent is collected in basin 42 and is measured by the first or second portion 32, 34 depending on if it is liquid or foam. The amount of agent is monitored by the computer 18 which updates the output of the burner accordingly. During the exercises, the supervisor 52 monitors the scene with camera 180 and monitor 182. The supervisor 52 can shut down the burners 24 if a dangerous situation arises. The tracking device 80 maintains a track on the trainee 72. The trainee 72 wears a personal tracking unit 82 which communicates with X and Y receivers 86. Datalink capabilities of the tracking unit 82 allow the trainee 72 to have communication with control.

Once the trainee 72 puts out the fire on one burner 24, the computer determines if the calculated value of heat content warrants reignition of the burner and when. Thus, the trainee 72 must be careful to apply the necessary amount of fire suppressing agent, not only to put out the fire, but also to reduce heat content of the simulated burning object. If the proper amount of fire suppressing agent is not used, the computer 18 can control the butterfly valve 70 to reignite the burner 24. Accordingly, the trainee 72 must go back and extinguish the fire again. This experience is very valuable since it simulates a real fire scenario. Alternatively, in order to avoid the danger of the reignited flare, the computer 18 can simply record that reignition should have occurred. This information can be logged in a report documenting the training session.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A fire fighter trainer comprising:

a burner assembly for providing fire, said burner assembly simulating a burning object;

means for detecting application of fire suppressing agent, said detecting means disposed adjacent to said burner assembly;

a control system for controlling the burner depending on a signal from the detecting means, said control system comprising parameters defining the simulated burning object, means for determining if the burning object simulated by the burner assembly would reignite based on application of fire suppressing agent and the parameters defining the simulated burning object, said control system in electrical communication with the detecting means and the burner assembly, said control system also comprises;

means for reigniting the burner assembly, said reigniting means in electrical communication with said determining means; and a personal tracking device for determining a fire fighter trainee's location in relation to the burner assembly.

2. A fire fighter trainer as described in claim 1 wherein the personal tracking device comprises a tracking unit to be worn by the fire fighter trainee and a receiver electrically communication with the tracking unit for maintaining a track on the fire further trainee.

3. A fire fighter trainer as described in claim 2 where the control system comprises a fireman down control for determining if a fire fighter trainee would have been in harm based on the location of the fire fighter.

4. A fire fighter trainer as described in claim 3 wherein said parameters comprise values for determining heat content of the object.

5. A fire fighter trainer as described in claim 4, wherein said control system comprising a computer having a memory, said parameters stored in the memory.

6. A fire fighter system as described in claim 5 wherein the burner assembly comprises a fuel delivery system, an ignition system and at least one burner, said ignition system in electrical communication with said control system.

7. A fire fighter system as described in claim 6 wherein the ignition system comprises a pilot assembly and an ignition transformer, said ignition transformer in electrical communication with the computer such that the computer can control the ignition transformer to cause the pilot assembly to light.

8. A fire fighter system as described in claim 7 wherein the fuel delivery system comprises a flame safety relay for shutting off gas to the burner if a sensed condition takes place.

9. A fire fighter system as described in claim 8 wherein the detecting means comprises a suppressant catchment system for measuring amount of fire suppressant and electrically communicating a corresponding signal to the control system, said suppressant catchment system in communication with said control system.

10. A fire fighter system as described in claim 9 wherein said suppressant catchment assembly comprises a first portion for measuring liquid fire suppressant and a second portion for measuring foam fire suppressant.

11. A fire fighter system as described in claim 10 wherein the first portion and second portion are in fluidic communication with a common channel, said channel having a screen for separating foam from liquid.

12. A fire fighter system as described in claim 11 including a smoke generator in electrical communication with said control system.

13. A fire fighter system as described in claim 12 including a simulated burning structure within which the burner assembly and detecting means are disposed.

14. A fire fighter system as described in claim 13 wherein the control system comprises a programmable logic controller, said programmable logic controller in electrical communication with the detecting means, burner assembly and the computer.

15. A fire fighter system as described in claim 14 wherein the memory comprises a table defining fire extinguishing properties of specific fire suppressants.

16. A fire fighter system as described in claim 15 wherein the control system comprises a camera and monitor for monitoring the structure during a fire simulation.

17. A fire fighter system as described in claim 4 wherein the control system comprises a mass adjacent to the burner and a thermocouple for determining the temperature of the mass.

18. A method of training fire fighters comprising the steps of:

inputting into a computer heat content parameters of a simulated burning object and fire extinguishing properties of specific fire suppressants;

applying a fire suppressing agent to a burner assembly, said burner assembly simulating a burning object;

determining a fire fighter trainee's location with a personal tracking device;

automatically determining if the burning object simulated by the burner assembly would reignite based on measuring application of fire suppressing agent and heat content parameters defining the simulated burning object, said burner having a fire output dependent on a type of suppressant, a detected amount of suppressant and a calculated value of the heat content of the object; and reigniting the burner assembly.

19. A fire fighter training system comprising:

a fire simulator; and means for determining constructive injury to a fire fighter trainee from the fire simulator during training, said determining means in electrical communication with said fire simulator.

20. A system as described in claim 19 wherein the fire simulator includes a burner assembly for providing fire.

21. A system as described in claim 20 wherein the determining means includes a personal tracking device for determining a fire fighter trainee's position in relation to the burner assembly.

22. A system as described in claim 21 wherein the personal tracking device comprises a tracking unit to be worn by the fire fighter trainee and a receiver electrically communicating with the tracking unit for maintaining a track on the fire fighter trainee.

23. A system as described in claim 22 including a control system having a fireman down control for determining if a fire fighter trainee would have been in harm based on the location of the fire fighter.

24. A system as described in claim 23 wherein the fireman down control has input comprised of the position of the fire fighter and sensors relating to the burner assembly.

25. A system as described in claim 23 wherein the tracking unit comprises a data link unit for allowing the control system to provide information to the tracking unit.

26. A system as described in claim 22 wherein the sensors include smoke sensors, hazardous material sensors, heat sensors and simulated explosion sensors.

27. A method for a trainee to learn how to fight fires comprising the steps of:

having the trainee enter a fire simulator;

igniting a flame from an object in the fire simulator;

sensing where the trainee is located relative to the fire;

placing a fire suppressant on the flame by the trainee; and identifying whether the trainee has been injured by the flame.

28. A method as described in claim 27 including after the placing step, the steps of sensing the suppressant placed on the fire, extinguishing the fire if enough suppressant has been placed on the fire, sensing the object's temperature, and reigniting the fire if the temperature of the object is above a predetermined temperature.

* * * * *